US009459707B2

United States Patent
Yoo et al.

(10) Patent No.: US 9,459,707 B2
(45) Date of Patent: Oct. 4, 2016

(54) DISPLAY APPARATUS AND METHOD OF CONTROLLING THE SAME

(71) Applicant: SAMSUNG ELECTRONICS CO., LTD., Suwon-si (KR)

(72) Inventors: Ho-june Yoo, Seoul (KR); Jong-bo Moon, Suwon-si (KR); Eun-seok Choi, Anyang-si (KR); Sang-on Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 13 days.

(21) Appl. No.: 14/337,928

(22) Filed: Jul. 22, 2014

(65) Prior Publication Data
US 2015/0091798 A1    Apr. 2, 2015

(30) Foreign Application Priority Data
Sep. 27, 2013  (KR) .................. 10-2013-0114964

(51) Int. Cl.
| G06F 3/033 | (2013.01) |
| G06F 3/0346 | (2013.01) |
| G06F 3/0484 | (2013.01) |
| G06F 3/0481 | (2013.01) |

(52) U.S. Cl.
CPC ......... *G06F 3/0346* (2013.01); *G06F 3/04812* (2013.01); *G06F 3/04842* (2013.01)

(58) Field of Classification Search
None
See application file for complete search history.

(56) References Cited

U.S. PATENT DOCUMENTS

| 5,757,358 | A | * | 5/1998 | Osga | .................. G06F 3/04842 345/157 |
| 5,808,601 | A | | 9/1998 | Leah et al. | |
| 5,905,497 | A | * | 5/1999 | Vaughan | ............... G06F 3/0482 345/157 |
| 5,990,862 | A | | 11/1999 | Lewis | |
| 6,031,531 | A | | 2/2000 | Kimble | |
| 6,064,387 | A | | 5/2000 | Canaday et al. | |
| 6,323,884 | B1 | | 11/2001 | Bird et al. | |
| 6,411,278 | B1 | | 6/2002 | Kage et al. | |
| 6,559,872 | B1 | | 5/2003 | Lehikoinen et al. | |
| 6,559,873 | B1 | | 5/2003 | Dawkins et al. | |
| 6,567,070 | B1 | | 5/2003 | Light et al. | |
| 6,642,947 | B2 | | 11/2003 | Feierbach | |
| 6,693,653 | B1 | | 2/2004 | Pauly | |
| 6,731,315 | B1 | | 5/2004 | Ma et al. | |

(Continued)

OTHER PUBLICATIONS

Communication dated May 8, 2013 issued by the European Patent Office in counterpart European Patent Application No. 12193588.6.

(Continued)

*Primary Examiner* — Alexander Eisen
*Assistant Examiner* — Kebede Teshome
(74) *Attorney, Agent, or Firm* — Sughrue Mion, PLLC

(57) ABSTRACT

A display apparatus and a method of controlling the display apparatus include displaying a plurality of display items on a display screen; acquiring a coordinate value of a position on the display screen pointed to by an input device; positioning a virtual pointer on the display screen in an area of first one of the plurality of display items that is proximate to the acquired coordinate value and highlighting the first display item on the display screen; and in response to the input device pointing to a new position, moving the virtual pointer according to a new coordinate value of the new position pointed to by the input device and highlighting a second one of the plurality of display items that is proximate to the new coordinate value on the display screen.

8 Claims, 9 Drawing Sheets

(56) References Cited

U.S. PATENT DOCUMENTS

| | | |
|---|---|---|
| 6,844,887 B2 | 1/2005 | Laffey et al. |
| 7,519,469 B2 | 4/2009 | de Silva et al. |
| 7,586,481 B1 | 9/2009 | Paquette et al. |
| 7,647,565 B2 | 1/2010 | Hayes, Jr. et al. |
| 7,730,430 B2 | 6/2010 | Baudisch et al. |
| 7,861,187 B2 | 12/2010 | Diederiks et al. |
| 8,112,722 B2 | 2/2012 | Chen et al. |
| 8,395,583 B2 | 3/2013 | Yamamoto |
| 8,675,014 B1 | 3/2014 | Milne et al. |
| 8,780,052 B2 | 7/2014 | Ohta |
| 2002/0003529 A1 | 1/2002 | Takase et al. |
| 2004/0012562 A1 | 1/2004 | Aymeric |
| 2004/0104940 A1 | 6/2004 | Giacomelli |
| 2004/0150619 A1 | 8/2004 | Baudisch et al. |
| 2009/0085867 A1 | 4/2009 | Bang et al. |
| 2009/0249257 A1 | 10/2009 | Bove et al. |
| 2009/0309833 A1 | 12/2009 | Nakamura |
| 2010/0265175 A1 | 10/2010 | Kabasawa et al. |
| 2011/0001694 A1 | 1/2011 | Homma et al. |
| 2011/0169734 A1* | 7/2011 | Cho ............... G06F 3/0346 345/157 |
| 2012/0062457 A1* | 3/2012 | Lee ............... G06F 3/0346 345/157 |
| 2012/0194429 A1 | 8/2012 | Kwon et al. |
| 2012/0235912 A1 | 9/2012 | Laubach |
| 2013/0117653 A1 | 5/2013 | Sukhanov et al. |
| 2013/0125066 A1 | 5/2013 | Klein et al. |
| 2013/0145320 A1* | 6/2013 | Oosterholt ......... G06F 3/04812 715/823 |
| 2013/0179835 A1 | 7/2013 | Moon et al. |
| 2014/0333534 A1* | 11/2014 | Choi ............... G06F 3/0346 345/157 |

OTHER PUBLICATIONS

Olivier Chapuis, et al., "DynaSpot: Speed-Dependent Area Cursor", CHI 2009, Apr. 8, 2009, Boston, Massachusetts, USA, pp. 1391-1400.
USPTO Office Action dated Apr. 15, 2015 issued in co-pending U.S. Appl. No. 13/679,298.
Written Opinion dated Nov. 26, 2014 issued by the International Searching Authority in counterpart International Patent Application No. PCT/KR2014/007346 (PCT/ISA/237).
Search Report dated Nov. 26, 2014 issued by the International Searching Authority in counterpart International Patent Application No. PCT/KR2014/007346 (PCT/ISA/210).
Communication dated Oct. 27, 2014 issued by the United States Patent and Trademark Office in counterpart U.S. Appl. No. 13/679,298.
Tovi Grossman et al.; "The Bubble Cursor: Enhancing Target Acquisition by Dynamic Resizing of the Cursor's Activation Area"; Papers: Smart Interaction Techniques 1; Apr. 2-7, 2005; Portland, Oregon, USA; pp. 281-290.
Communication dated Sep. 24, 2015 issued by United States Patent and Trademark Office in counterpart U.S. Appl. No. 13/679,298.

* cited by examiner

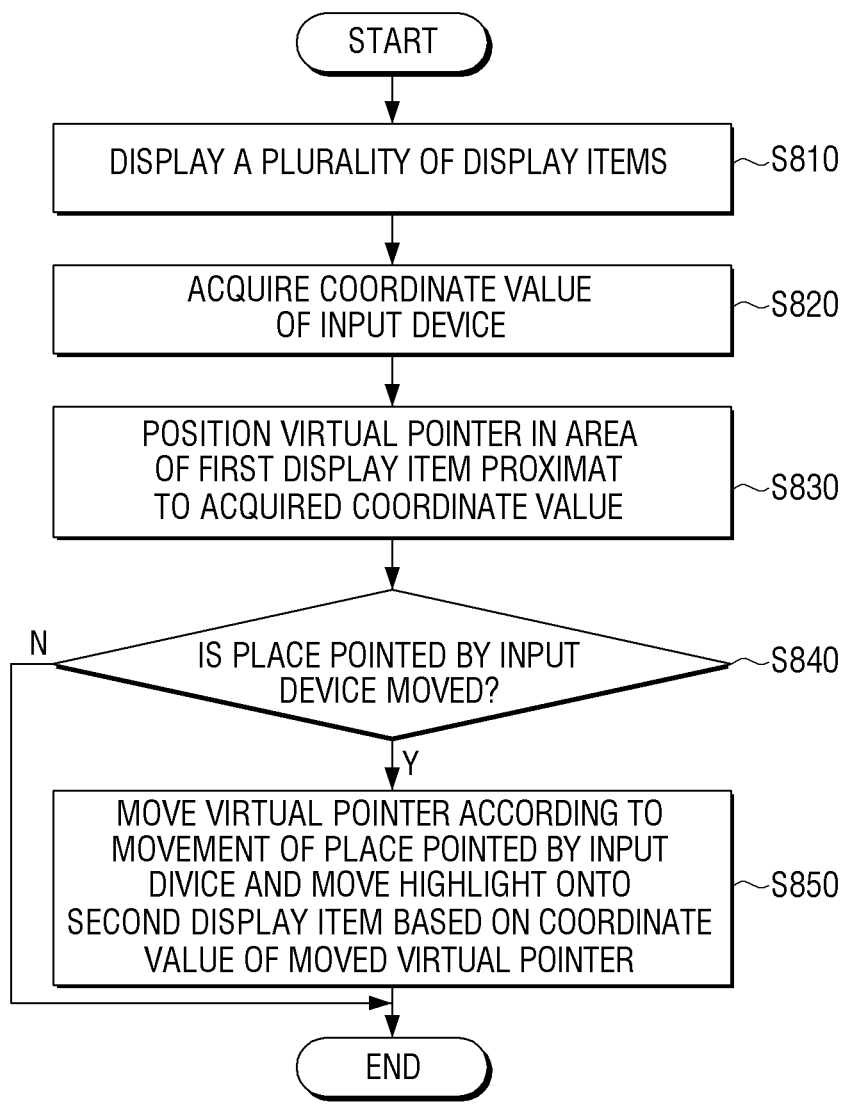

DISPLAY APPARATUS AND METHOD OF CONTROLLING THE SAME

CROSS-REFERENCE TO RELATED APPLICATION(S)

This application claims priority under 35 U.S.C. §119 from Korean Patent Application No. 10-2013-0114964, filed on Sep. 27, 2013, in the Korean Intellectual Property Office, the disclosure of which is incorporated herein by reference in its entirety.

BACKGROUND

1. Field

Exemplary embodiments relate to providing a display apparatus and a method of controlling the same, and more particularly, to providing a display apparatus that moves highlights displayed on a plurality of display items by using an input device, and a method of controlling the same.

2. Description of the Related Art

A display apparatus may perform various functions by using a plurality of display items and highlights. In particular, to perform various functions by using the plurality of display items and highlights, the display apparatus controls the highlights by using a four-way button and an enter button or controls the highlights by using a pointer.

In detail, if the display apparatus controls the highlights by using the four-way button and the enter button, the display apparatus moves the highlights by using the four-way button and selects a display item on which a highlight is positioned, by using the enter button. However, if the display apparatus controls the highlights by using the four-way button and the enter button, a user is less intuitive about controlling the highlights by using the four-way button and the enter button than about controlling the highlights by using the pointer. Also, the user has control difficulty pressing a button several times.

The display apparatus may also control the highlights by using the pointer through an absolute pointing type of input device, such as a pointing device. However, precise control is needed to position a highlight on a display item, and thus the user has difficulty selecting the display item. Also, if the pointer is not positioned on the display item when the display apparatus controls the highlight by using the pointer, the highlight is not displayed on the display item displayed on a screen.

Therefore, there is a need for methods of further conveniently and intuitively controlling a highlight.

SUMMARY

Aspects of the exemplary embodiments address at least the above problems and/or disadvantages and other disadvantages not described above. Also, the exemplary embodiments are not required to overcome the disadvantages described above, and an exemplary embodiment may not overcome any of the problems described above.

The exemplary embodiments provide a display apparatus that positions a virtual pointer in an area of a display item proximate to a place pointed by an input device and moves a highlight displayed on the display item by using the virtual pointer to further conveniently and intuitively control the highlight, and a method of controlling the same.

According to an aspect of the exemplary embodiments, there is provided a method of controlling a display apparatus. The method may include: displaying a plurality of display items on a display screen; acquiring a coordinate value of a position on the display screen pointed to by an input device; positioning a virtual pointer on the display screen in an area of first one of the plurality of display items that is proximate to the acquired coordinate value and highlighting the first display item on the display screen; and in response to the input device pointing to a new position, moving the virtual pointer according to a new coordinate value of the new position pointed to by the input device and highlighting a second one of the plurality of display items that is proximate to the new coordinate value on the display screen.

The positioning may include: positioning the virtual pointer in a center area of the first display item on the display screen; and calculating a difference value between the coordinate value of the position pointed to by the input device and a coordinate value in the center area of the first display item.

When the position pointed to by the input device is moved so that the coordinate value of the position is closer to the coordinate value of the position on which the virtual pointer is positioned, the virtual pointer may be moved to reduce the difference value.

When the position pointed to by the input device is moved so that the coordinate value of the position is far away from the coordinate value of the position on which the virtual pointer is positioned, the difference value may be maintained, and the virtual pointer may be moved.

When the moved virtual pointer is closer to the second display item than the first display item, the highlighting may be moved from the first display item onto the second display item.

The method may further include: when a selection command is input from the input device, moving the virtual pointer into a center of a display item on which the highlighting is displayed.

The virtual pointer may be more dimly displayed than a highlighted display item.

The input device may be an absolute pointing type of input device.

According to another aspect of the exemplary embodiments, there is provided a display apparatus including: a display unit configured to display a plurality of display items on a display screen; a communicator configured to receive from an input device information indicating a coordinate value of a position on the display screen pointed to by the input device; and a controller configured to acquire the coordinate value of the position pointed to by the input device based on the information received through the communicator, control the display unit to position a virtual pointer in an area of first one of the plurality of display items proximate to the acquired coordinate value, display a highlight on the first display item, in response to the position pointed to by the input device being changed to a new position, move the virtual pointer according to a new coordinate value of the new position pointed to by the input device, and move the highlight onto second one of the plurality of display items that is proximate to the new coordinate value on the display screen.

The controller may position the virtual pointer in a center area of the first display item on the display and calculate a difference value between the coordinate value of the position pointed to by the input device and a coordinate value of the virtual pointer positioned in the center area of the first display item.

When the position pointed to by the input device is moved so that the coordinate value of the position is closer to the coordinate value of the virtual pointer, the controller is configured to move the virtual pointer to reduce the difference value.

When the position pointed to by the input device is moved so that the coordinate value of the position is far away from the coordinate value of the virtual pointer, the controller is configured to maintain the difference value and move the virtual pointer.

When the moved virtual pointer is closer to the second display item than the first display item, the controller controls the display unit to move the highlight from the first display item onto the second display item.

In response to an input of a selection command from the input device through the communicator, the controller is configured to move the virtual pointer into a center of a highlighted display item.

The controller may control the display unit to more dimly display the virtual pointer than a highlighted display item.

The input device may be an absolute pointing type of input device.

BRIEF DESCRIPTION OF THE DRAWINGS

The above and/or other aspects will be more apparent by describing certain exemplary embodiments with reference to the accompanying drawings, in which:

FIG. 8 is a flowchart illustrating a method of controlling a display apparatus, according to an exemplary embodiment of the present general inventive concept.

DETAILED DESCRIPTION OF THE EXEMPLARY EMBODIMENTS

Figure 1:
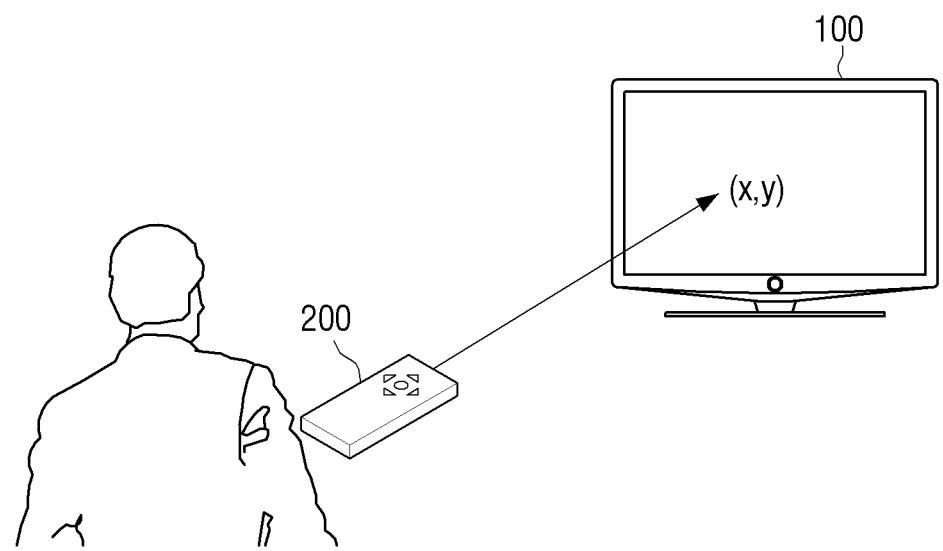
FIG. 1 is a view illustrating a display system according to an exemplary embodiment of the present general inventive concept.

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments may be carried out without those specifically defined matters. Also, detailed descriptions of well-known functions or constructions may not be provided to avoid obscuring the exemplary embodiments with unnecessary detail.

FIG. 1 is a view illustrating a display system 10 including a display apparatus 100 and an input device 200, according to an exemplary embodiment of the present general inventive concept. As shown in FIG. 1, the display apparatus 100 may be a display apparatus such as a smart TV, but this is only an exemplary embodiment. The display apparatus 100 may be realized as a display apparatus such as a desktop PC, a tablet PC, a smartphone, or the like. The input device 200 may be realized as a pointing device as shown in FIG. 1 but may be realized as an absolute pointing type of input device.

The display apparatus 100 displays a plurality of display items. Here, the plurality of display items may be icons of a graphical user interface for executing a function or controlling access to contents of the display apparatus 100, but the plurality of items is not limited thereto.

The input device 200 senses a motion of the input device 200 to transmit coordinate value information of a coordinate position currently pointed by the input device 200 to the display apparatus 100. In detail, the input device 200 may acquire motion information through a sensor, such as an acceleration sensor or a geomagnetic sensor, and transmit the acquired motion information to the display apparatus 100. The acquired motion information may be transmitted to the display apparatus 100 as a signal corresponding to the motion information or a signal including the acquired motion information. The display apparatus 100 calculates a coordinate value of the position pointed by the input device 200 based on the motion information received from the input device 200.

The transmission of the motion information through the input device 200 is only an exemplary embodiment. Therefore, the input device 200 may calculate the coordinate value information of the position currently pointed by the input device 200, based on the acquired motion information and transmit the calculated coordinate value information to the display apparatus 100. The coordinate value information may be transmitted to the display apparatus 100 as a signal corresponding to the coordinate information or a signal including the coordinate information.

The display apparatus 100 positions a virtual pointer in an area (for example, in a center area) of first one of the plurality of display items proximate to the position currently pointed by the input device 200 based on the calculated coordinate value and displays a highlight on the first display item. Here, the display apparatus 100 may calculate a difference value between the coordinate value of the position pointed by the input device 200 and a coordinate value of the center area of the first display item at which the virtual pointer is displayed. According to an exemplary embodiment of the present general inventive concept, the display apparatus 100 may not display the virtual pointer or may more dimly display the virtual pointer than a highlighted display item.

If the input device 200 is moved, such that the input device 200 points to a new coordinate location, the display apparatus 100 moves the virtual pointer according to the movement of the input device 200. In detail, if the input device 200 is moved so that the coordinate value of the position at which the input device 200 points is proximate to the coordinate value of the virtual pointer, the display apparatus 100 may move the virtual pointer to reduce the calculated difference value or may maintain the virtual pointer on a current display item. If the input device 200 is moved so that the new coordinate is far away from the coordinate value of the virtual pointer, the display apparatus 100 may maintain the calculated difference value and move the virtual pointer.

The display apparatus 100 may move the highlight onto a second one of the plurality of display items based on a coordinate value of the moved virtual pointer. In detail, if the moved virtual pointer is closer to the second display item than the first display item, the display apparatus 100 may move the highlight onto the second display item.

Through the display system 10 as described above, the user may further intuitively and conveniently move a highlight by using an absolute mapping type of input device such as a pointing device.

A structure of the display apparatus 100 will now be described in detail with reference to FIGS. 2 through 6.

Figure 2:
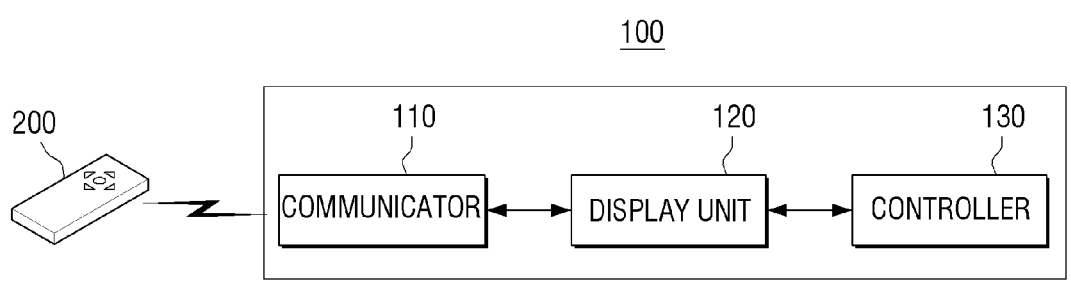
FIG. 2 is a schematic block diagram illustrating a structure of a display apparatus, according to an exemplary embodiment of the present general inventive concept.

FIG. 2 is a schematic block diagram illustrating the structure of the display apparatus 100, according to an exemplary embodiment of the present general inventive concept. Referring to FIG. 2, the display apparatus 100 includes a communicator 110, a display unit 120, and a controller 130.

The communicator 110 communicates with the input device 200. Here, the communicator 110 may receive signals for at least one of motion information of the input device 200 and a button selection command from the input device 200. Here, the input device 200 may be an absolute pointing type input device, such as a pointing device. The communicator 110 may receive information indicating a coordinate value of a coordinate position on the display unit 130 currently pointed by the input device 200 from the input device 200.

The display unit 120 outputs image data under control of the controller 130. In particular, the display unit 120 may display a plurality of display items and display a highlight on one of the plurality of display items. The display unit 120 may also more dimly display a virtual pointer than the display item.

The controller 130 controls an overall operation of the display apparatus 100. In detail, the controller 130 may control the display unit 120 to acquire a coordinate value of a coordinate position on the display unit 120 pointed to by the input device 200 based on the received information, position the virtual pointer on the display unit 120 in an area of first one of the plurality of display items proximate to the acquired coordinate value, and display the highlight on the first display item.

In detail, the controller 130 may calculate the coordinate value of the coordinate position pointed by the input device 200 based on the motion information received through the communicator 110. According to another exemplary embodiment of the present general inventive concept, the controller 130 may control the communicator 110 to directly receive from the input device 200 coordinate value information about the position pointed to by the input device 200.

The controller 130 may control the display unit 120 to position the virtual pointer on one of the plurality of displayed display items based on the calculated coordinate value and display a highlight on the display item on which the virtual pointer is positioned. In detail, if the coordinate value of the position pointed to by the input device 200 is proximate to the first display item of the plurality of display items, the controller 130 may control the display unit 120 to position the virtual pointer in a center area of the first display item and display a highlight on the first display item. Here, the controller 130 may calculate a difference value between the coordinate value of the position pointed to by the input device 200 and a coordinate value of a position in which the virtual pointer is positioned.

The controller 130 may control the display unit 120 to display at least one of the virtual pointer and an actual pointer indicating a position actually pointed to by the input device 200. The controller 130 may control the display unit 120 not to display the virtual pointer or to more dimly display the virtual pointer than a highlighted display item.

The controller 130 may receive a signal for moving the position pointed to by the input device 200 from the input device 200 through the communicator 110.

If the signal for moving the position pointed to by the input device 200 is received from the input device 200, the controller 130 may move the virtual pointer according to a movement of the position corresponding to movement by the input device 200. In detail, if the position pointed by the input device 200 is moved so that the coordinate value of the position is proximate to the coordinate value of the virtual pointer, the controller 130 may move the virtual pointer to reduce the calculated difference value or may maintain the virtual item on a current display item. If the position is moved so that the coordinate value of the position is far away from the coordinate value of the virtual pointer, the controller 130 may maintain the difference value and move the virtual pointer.

The controller 130 may control the display unit 120 to move the highlight onto a second one of the plurality of display items based on the coordinate value of the moved virtual pointer. In detail, if the moved virtual pointer is closer to the second display item than the first display item, the controller 130 may control the display unit 120 to move the highlight onto the second display item. Here, the controller 130 may move the virtual pointer into an area (for example, a center area) of the second display item.

If a selection command is input from the input device 200 through the communicator 110, the controller 130 may move the virtual pointer into a center of a display item on which a current highlight is displayed. Therefore, if the position to pointed by the input device 200 changes when a user performs selection, the position of the virtual pointer may be maintained in a center of a display item to prevent an error occurring due to an incorrect or unintended selection.

Figure 3:
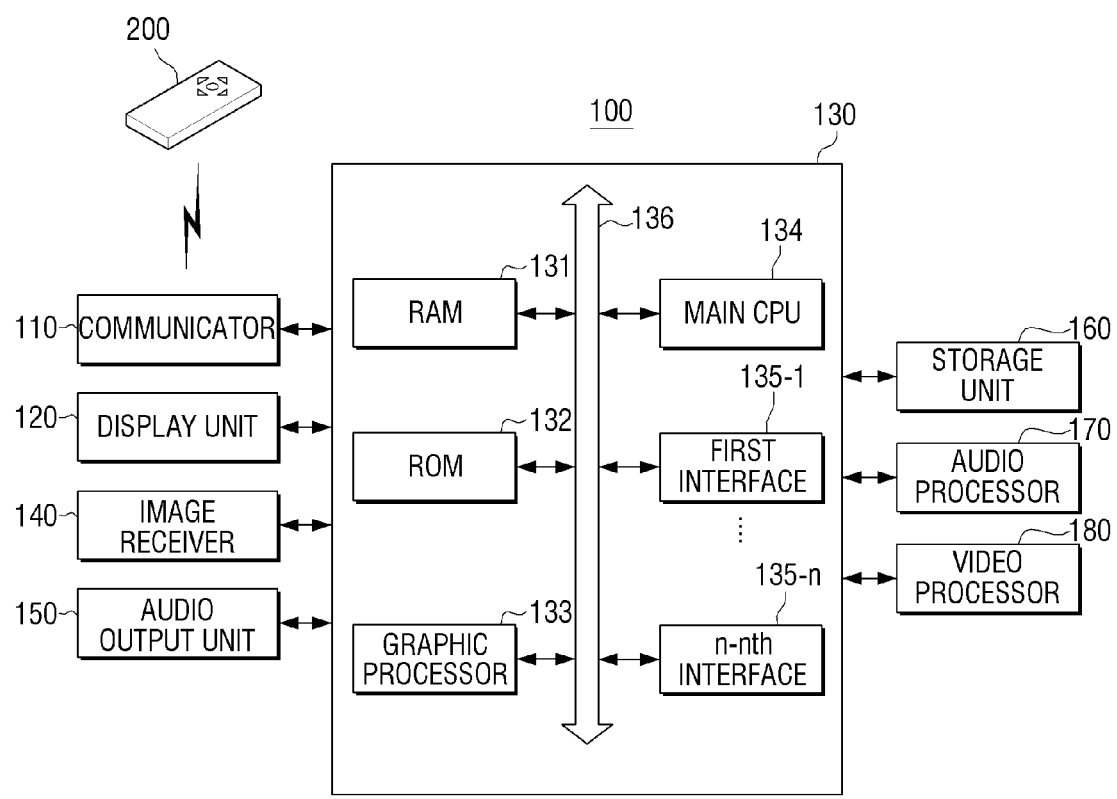
FIG. 3 is a detailed block diagram illustrating a structure of a display apparatus, according to an exemplary embodiment of the present general inventive concept.

FIG. 3 is a detailed block diagram illustrating a structure of the display apparatus 100, according to an exemplary embodiment of the present general inventive concept. Referring to FIG. 3, the display apparatus 100 includes the communicator 110, the display unit 120, the controller 130, an image receiver 140, an audio output unit 150, a storage unit 160, an audio processor 170, and a video processor 180.

The communicator 110 communicates with various types of external apparatuses according to various types of communication methods. The communicator 110 may include various types of communication chips such as a WiFi chip, a Bluetooth chip, a near field communication (NFC) chip, a wireless communication chip, etc. Here, the WiFi chip, the Bluetooth chip, and the NFC chip respectively perform communications by using a WiFI method, a Bluetooth method, and an NFC method. Among these, the NFC chip operates according to an NFC method using 13.56 MHz band of various radio frequency (RFID) frequency bands such as 135 kHz, 13.56 MHz, 433 MHz, 860~960 MHz, 2.45 GHz, etc. If the WiFi chip or the Bluetooth chip is used, various types of connection information such as subsystem identification (SSID), a session key, etc. may be first transmitted and received to perform communication connections by using the various types of connection information to transmit and receive various types of information. The wireless communication chip performs communications according to various communication standards such as IEEE, Zigbee, 3rd Generation (3G), 3r Generation Partnership Project (3GPP), Long Term Evolution (LTE), etc.

In particular, the communicator 110 may communicate with the input device 200 to receive motion information (or coordinate value information) and a button selection command from the input device 200.

The display unit 120 displays at least one of a video frame based on image data received from the image receiver 140 and processed by the video processor 180, and may display various types of screens generated by a graphic processor 133. In particular, the display unit 120 may display a pointer and a plurality of display items on a graphical user interface.

The image receiver 140 receives image data through various types of sources. For example, the image receiver 140 may receive broadcasting data from an external broadcasting station and receive image data from an external apparatus (for example, a digital versatile disc (DVD) apparatus).

The audio output unit 150 outputs various types of audio data processed by the audio processor 170 and various types of notification sounds or voice messages.

The storage unit 160 stores various types of modules for driving the display apparatus 100. For example, the storage unit 160 may store software including a base module, a sensing module, a communication module, a presentation module, a web browser module, and a service module. Here, the base module processes signals transmitted from various types of hardware of the display apparatus 100 and transmits the processed signals to an upper layer. The sensing module collects information from various types of sensors, and analyzes and manages the collected information and may include a face recognition module, a voice recognition module, a motion recognition module, an NFC recognition module, etc. The presentation module constitutes a display screen and may include a multimedia module that plays and outputs multimedia contents and a user interface (UI) rendering module that processes a UI and a graphic. The communication module communicates with an external apparatus. The web browser module performs web-browsing to access a web server. The service module includes various types of applications for providing various types of services.

As described above, the storage unit 160 may include various types of program modules. Some of the various types of program modules may be omitted, changed, or added according to a type and a characteristic of the display apparatus 100. For example, if the display apparatus 100 is realized as a tablet PC, the base module may further include a position determination module that determines a global positioning system (GPS)-based position, and the sensing module may further include a sensing module that senses a motion of the user.

The storage unit 160 may store a module that controls a highlight by using a virtual pointer.

The audio processor 170 processes audio data. The audio processor 170 may perform, various types of processing such as decoding, amplifying, noise-filtering, etc. on the audio data. The audio data processed by the audio processor 170 may be output to the audio output unit 150.

The video processor 180 processes the image data received from the image receiver 140. The video processor 180 may perform various types of image processing, such as decoding, scaling, noise-filtering, a frame rate conversion, a resolution conversion, etc. on the image data.

The controller 130 controls an overall operation of the display apparatus 100 by using various types of programs stored in the storage unit 160.

As shown in FIG. 3, the controller 130 includes a random access memory (RAM) 131, a read only memory (ROM) 132, the graphic processor 133, a main central processing unit (CPU) 134, first through nth interfaces 135-1 through 135-n, and a bus 136. Here, the RAM 131, the ROM 132, the graphic processor 133, the main CPU 134, the first through nth interfaces 135-1 through 135-n, etc. may be connected to one another through the bus 136.

The ROM 132 stores a command set, etc. for booting a system. If a turn-on command is input, and thus power is supplied, the main CPU 134 copies an operating system (O/S) stored in the storage unit 160 into the RAM 131 according to a command stored in the ROM 132 and executes the O/S to boot the system. If the system is completely booted, the main CPU 134 copies various types of application programs stored in the storage unit 160 into the RAM 131 and executes the application programs copied into the RAM 131 to perform various operations.

The graphic processor 133 generates a graphic user interface including various types of objects, such as a pointer, an icon, an image, a text, etc., by using a calculator (not shown) and a renderer (not shown). The calculator calculates attribute values, such as coordinate values, shapes, sizes, colors, etc. of objects, according to a layout of the screen by using a control command received from an input unit. The renderer generates a screen of various types of layouts including objects based on the attribute values calculated by the calculator. The screen generated by the renderer is displayed in a display area of the display unit 120.

The main CPU 134 accesses the storage unit 160 to perform booting by using the O/S stored in the storage unit 160. The main CPU 134 also performs various operations by using various types of programs, contents, data, etc. stored in the storage unit 160.

The first through nth interfaces 135-1 through 135-n are connected to various types of elements described above. One of the first through nth interfaces 135-1 through 135-n may be a network interface that is connected to an external apparatus through a network.

Figure 4:
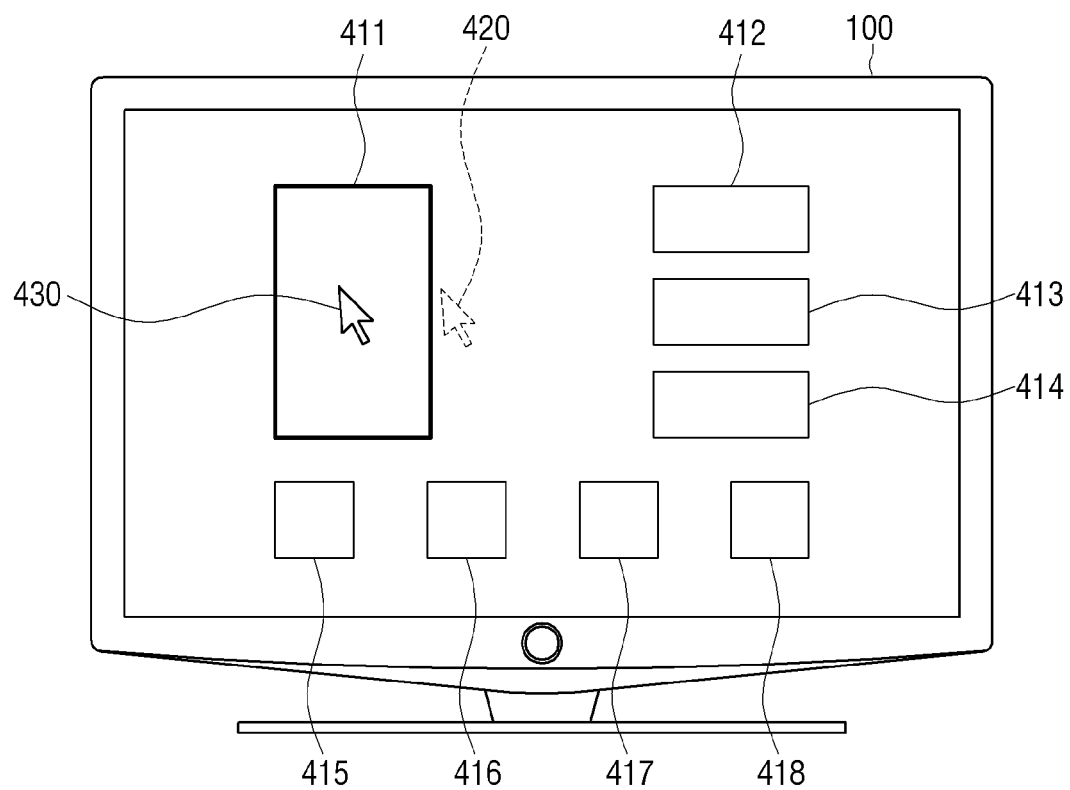
FIGS. 4 through 6 are views illustrating a method of controlling a highlight by using a virtual pointer, according to an exemplary embodiment of the present general inventive concept.

In particular, the controller 130 may control the display unit 120 to set a function of the display apparatus 100 according to a user command or may display a plurality of display items for executing contents. For example, the controller 140 may control the display unit 120 to display first through eighth display items 411 through 418 as shown in FIG. 4.

If motion information is received from the input device 200 when the plurality of display items (i.e., the first through eighth display items 411 through 418) are displayed, the controller 130 may calculate coordinate value information of a place currently pointed by the input device 200 based on the received motion information.

According to another exemplary embodiment, when the plurality of display items (i.e., the first through eighth display items 411 through 418) are displayed, the controller 130 may receive the coordinate value information of the place currently pointed by the input device 200 from the input device 200 through the communicator 110.

If the coordinate value information of the position currently pointed by the input device 200 is received, the controller 130 may control the display unit 120 to position the virtual pointer in an area of one of the plurality of display items (i.e., the first through eighth display items 411 through 418) proximate to the coordinate value of the position currently pointed by the input device 200. In detail, if a display item proximate to a position 420 currently pointed to by the input device 200 is the first display item 411 as shown in FIG. 4, the controller 130 may control the display unit 120 to position a virtual pointer 430 in a center area of the first display item 411.

The controller 130 may also control the display unit 120 to display a highlight on the display item proximate to the coordinate value of the place currently pointed by the input device 200. In detail, if a display item proximate to the place 420 currently pointed by the input device 200 is the first display item 411, the controller 130 may control the display unit 120 to display a highlight on the first display item 411 as shown in FIG. 4.

Here, the controller 130 may calculate a difference value between the coordinate value of the position 420 actually pointed by the input device 200 and a coordinate value of a position on which the virtual pointer 430 is positioned.

Figure 5A:
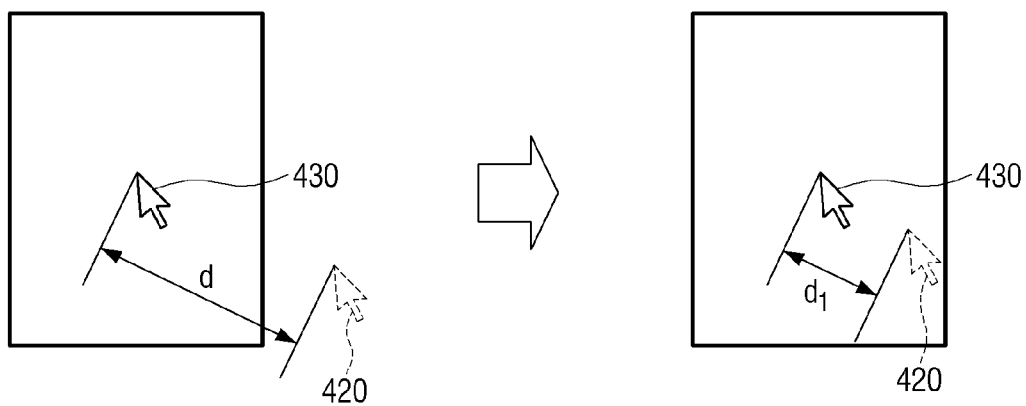

When a highlight is displayed on the first display item 411 on which the virtual pointer is positioned, the controller 130 may control the display unit 120 to move the virtual pointer according to a movement command received from the input device 200. In detail, if the position pointed to by the input device 200 is moved so that the coordinate value of the position is close to the coordinate value of the position on which the virtual pointer is positioned, the controller 130 may move the virtual pointer to reduce the calculated difference value. For example, a difference 'd' may be the value between a coordinate value of the position 420 actually pointed to by the input device 200 and the coordinate value of the position 430 on which the virtual pointer is positioned as illustrated in FIG. 5A. If the position 420 pointed to by the input device 200 is moved towards to the position 430, the controller 130 gradually reduces a difference value '$d_1$' between the two places as shown in FIG. 5A. As another example, if the position to pointed by the input device 200 is moved so that the coordinate value of the position is closer to the coordinate value of the position on which the virtual pointer is positioned, the controller 130 may maintain the virtual pointer on a current display item.

Figure 5B:
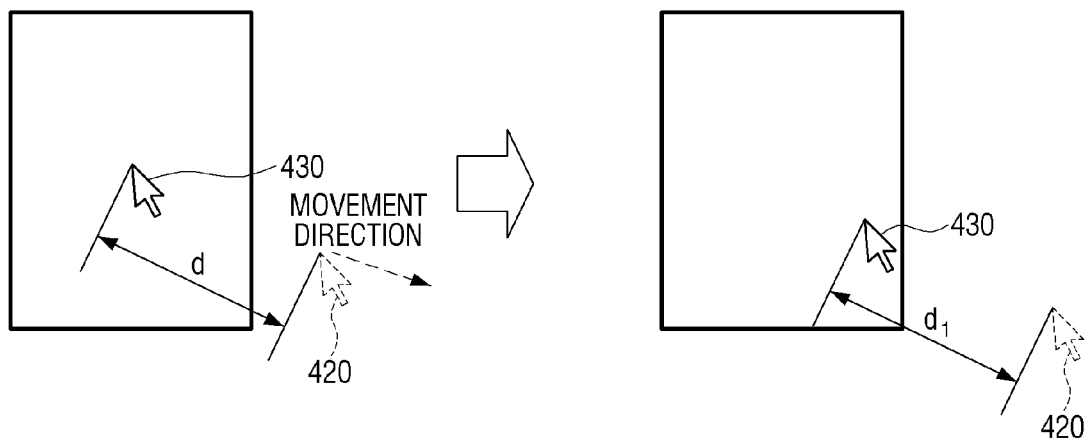

However, if the position pointed by the input device 200 is moved so that the coordinate value of the position is far away from the coordinate value of the position on which the virtual pointer is positioned, the controller 130 may maintain the calculated difference value and move the virtual pointer. For example, if a difference value between the coordinate value of the position 420 actually pointed to by the input device 200 and the coordinate value of the position 430 on which the virtual pointer is positioned is 'd' as shown in FIG. 5B, and the position 420 is moved to be far away from the position 430, the controller 130 may move the virtual pointer like a movement of the position 420 to maintain the difference value '$d_1$' as shown in FIG. 5B.

The controller 130 may control the display unit 120 to move a highlight displayed on a display item onto another display item according to a position of the moved virtual pointer. In detail, if the moved virtual pointer is closer to a second display item than a first display item, the controller 130 may control the display unit 120 to move the highlight onto the second display item. In detail, if a user command for moving the virtual pointer in a right upper direction is received from the input device 200 when the virtual pointer is positioned as shown in FIG. 4, the position 420 pointed by the input device 200 is moved to be far away from the position 430 on which the virtual pointer is positioned. Therefore, the controller 130 may maintain a difference value between the positions 420 and 430 and move the virtual pointer. If the virtual pointer is closer to the second display item 412 than the first display item 411 when the virtual pointer is moved, the controller 130 may control the display unit 120 to move a highlight displayed on the first display item 411 onto the second display item 412 and move the virtual pointer into a center area of the second display item 412.

Figure 6:
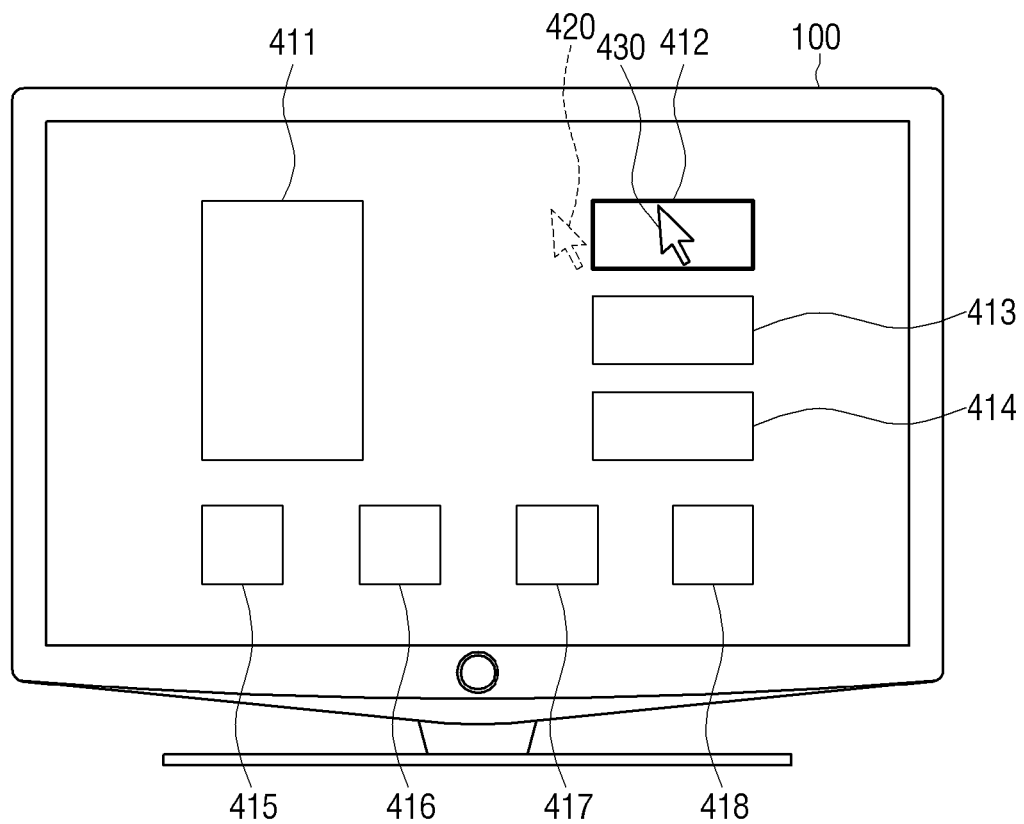

If a selection command is received from the input device 200 through the communicator 110, the controller 130 may move the virtual pointer into a center of a display item on which a current highlight is displayed and select a display item. In detail, if a selection command is received from the input device 200 through the communicator 110 when a highlight is positioned on the second display item 412 as shown in FIG. 6, the controller 130 may move the virtual pointer into a center area of the second display item 412 and select the second display item 412 although the virtual pointer is moved due to a motion performed according to the selection command. Therefore, although the user moves the input device 200 according to the selection command, a display item on which a current highlight is displayed is not changed, and thus an error occurring due to a user's selection of another undesired display item may be prevented.

According to an exemplary embodiment of the present general inventive concept, the controller 130 may control the display unit 120 to not display the virtual pointer or to more dimly display the virtual pointer than a highlighted display item. In detail, a position of the virtual pointer may appear suddenly due to a movement of a highlight, and thus the virtual pointer may not be displayed or may be dimly displayed so that the user further intuitively move the highlight.

According to the above-described exemplary embodiment, the user may further conveniently and intuitively control a highlight by using an absolute pointing type of input device such as a pointing device.

Figure 7:
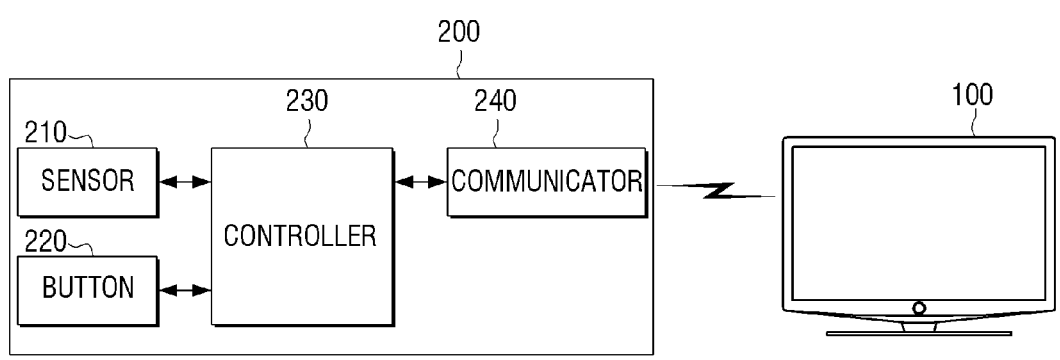
FIG. 7 is a block diagram illustrating a structure of an input device according to an exemplary embodiment of the present general inventive concept.

FIG. 7 is a schematic block diagram illustrating a structure of the input device 200, according to an exemplary embodiment of the present general inventive concept. Referring to FIG. 7, the input device 200 includes a sensor 210, a button 220, a controller 230, and a communicator 240. Here, the input device 200 may be an absolute pointing type of input device such as a pointing device.

The sensor 210 senses a motion of the input device 200 to acquire information about a position pointed to by the input device 200. Here, the sensor 210 may include an acceleration sensor, a geomagnetic sensor, and a gyro sensor for acquiring the information about the position pointed by the input device 200. In detail, the geomagnetic sensor measures an azimuth by using geomagnetic values of three axes (X, Y, and Z axes) according to the motion of the input device 200. The gyro sensor measures movement displacements of two axes (X and Y axes) according to the motion of the input device 200. The acceleration sensor calculates an azimuth of the geomagnetic sensor as an earth coordinate system-based absolute azimuth by using measured acceleration and converts a movement angle displacement into an earth coordinate system-based absolute movement angle displacement. Therefore, the controller 230 may apply input absolute azimuth and absolute movement displacement Kalman filter to correct a cumulative error of the gyro sensor and output information about a coordinate value pointed by the input device 200. However, as described above, the sensor 210 uses a sensor to sense a motion to acquire information about a position pointed by the input device 200, but this is only an exemplary embodiment. The sensor 210 may be realized as various types of sensors such as a camera sensor, etc.

The button 220 is a user interface for receiving input of a user command for selecting and dragging an item. Here, the button 220 may be installed outside the input device 200.

The communicator 240 may communicate with the display apparatus 100. Here, the communicator 240 may transmit at least one of motion information, coordinate value information, and a button selection signal to the display apparatus 100.

The controller 230 may sense the motion of the input device 200 sensed by the sensor 210 to calculate a coordinate value of the position pointed to by the input device 200.

The controller 230 may transmit the coordinate value of the position pointed to by the input device 200 to the display apparatus 100 through the communicator 240. If the button 220 is selected, the controller 230 may transmit the button selection command to the display apparatus 100.

A method of controlling the display apparatus 100 according to an exemplary embodiment of the present general inventive concept will now be described with reference to FIG. 8.

In operation S810, the display apparatus 100 displays a plurality of display items. Here, the plurality of display items may be display items corresponding to functions of the display apparatus 100 or correspond to contents to be reproduced on the display apparatus 100.

In operation S820, the display apparatus 100 acquires a coordinate value of a position pointed by the input device 200. Here, the display apparatus 100 may receive the coordinate value of the position pointed to by the input device 200 from the input device 200. According to another exemplary embodiment, the display apparatus 100 may acquire motion information of the input device 200 from the input device 200 and calculate the coordinate value of the position pointed to by the input device 200 based on the acquired motion information.

In operation S830, the display apparatus 100 positions a virtual pointer in an area of a first display item proximate to the acquired coordinate value and displays a highlight on the first display item. Here, the display apparatus 100 may position the virtual pointer in a center area of the first display item proximate to the acquired coordinate value. The display apparatus 100 may also calculate a difference value between the coordinate value of the place pointed by the input device 200 and a coordinate value of a position on which the virtual pointer is positioned.

In operation S840, the display apparatus 100 determines whether the position to pointed by the input device 200 is changed.

If it is determined in operation S840 that the place pointed by the input device 200 is changed, the display apparatus 100 move the virtual pointer according to a motion corresponding to the position pointed to by the input device 200 and moves the highlight onto a second display item based on a coordinate value of the moved virtual pointer (S850). In detail, if the position pointed by the input device 200 is moved so that the coordinate value of the position is closer to the coordinate value of the position on which the virtual pointer is positioned, the display apparatus 100 may move the virtual pointer to reduce the calculated difference value. If the position pointed to by the input device 200 is moved so that the coordinate value of the position is far away from the coordinate value of the place on which the virtual pointer is positioned, the display apparatus 100 may maintain the calculated difference value and move the virtual pointer. If the moved virtual pointer is closer to the second display item than the first display item when the virtual pointer is moved, the display apparatus 100 may move the highlight onto the second display item.

According to the above-described method, a user may further intuitively and conveniently control a highlight by using an absolute pointing type of input device such as a pointing device.

As described above, according to various exemplary embodiments of the present general inventive concept, a user may further conveniently and intuitively control a highlight by using an input device such as a pointing device.

A method of controlling a display apparatus according to various embodiments of the present general inventive concept as described above may be realized as a program to be provided to the display apparatus or an input device. In particular, the program including the method of controlling the display apparatus may be stored and provided on a non-transitory computer-readable medium.

The non-transitory computer-readable medium refers to a medium which does not store data for a short time such as a register, a cache memory, a memory, or the like but semi-permanently stores data and is readable by a device. In detail, the above-described applications or programs may be stored and provided on a non-transitory computer readable medium such as a CD, a DVD, a hard disk, a blue-ray disk, a universal serial bus (USB), a memory card, a ROM, or the like.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of controlling a display apparatus, the method comprising:
   displaying a plurality of display items on a display screen;
   acquiring a coordinate value of a position on the display screen pointed to by an input device;
   positioning a virtual pointer on the display screen in a center of an area of a first display item among the plurality of display items that is proximate to the acquired coordinate value;
   calculating a first difference value between the coordinate value of the position pointed to by the input device and a coordinate value of the center of the area of the first display item:
   acquiring a new coordinate value of a new position on the display screen pointed to by the input device;
   determining whether a second difference value between the coordinate value in the center of the area of the first display item and a coordinate value of the new position is less than the first difference value;
   in response to determining that the second difference value is less than the first difference value, maintaining the positioning of the virtual pointer in die center of the area of the first display item while the second difference value is less than the first difference value, and in response to determining that the second difference value is not less than the first difference value, maintaining the first difference value between the coordinate value of the new position and moving the virtual pointer to a position that is the new coordinate value of the new position pointed to by the input device adjusted by the first difference value
   wherein the virtual pointer is more dimly displayed than a highlighted display item.

2. The method of claim 1, further comprising:
   when the moved virtual pointer is closer to a second display item among the plurality of display items than the first display item, the virtual pointer is moved onto the second display item.

3. The method of claim 1, further comprising:
   when a selection command is input from the input device, moving the virtual pointer into a center of a display item.

4. The method of claim 1, wherein the input device is an absolute pointing type of input device.

5. A display apparatus comprising:
a display unit configured to display a plurality of display items on a display screen;
a communicator configured to receive from an input device information indicating a coordinate value of a position on the display screen pointed to by the input device; and
a controller configured to acquire the coordinate value of the position pointed to by the input device based on the information received through the communicator, control the display unit to position a virtual pointer in a center of an area of a first display item among the plurality of display items proximate to the acquired coordinate value, calculate a first difference value between the coordinate value of the position pointed to by the input device and a coordinate value of the center of the area of the first display item, acquire a new coordinate value of a new position on the display screen pointed to by the input device, determine whether a second difference value between the coordinate value in the center of the area of the first display item and a coordinate value of the new position is less than the first difference value, in response to determining that the second difference value is less than the first difference value, control the display unit to maintain the positioning of the virtual pointer in the center of the area of the first display item while the second difference value is less than the first difference value, and in response to determining that the second difference value is not less than the first difference value, control the display unit to maintain the first difference value between the coordinate value of the new position and move the virtual pointer to a position that is the new coordinate value of the new position pointed to by the input device adjusted by the first difference value,
wherein the controller is configured to control the display unit to more dimly display the virtual pointer than a highlighted display item.

6. The display device of claim 5, wherein when the moved virtual pointer is closer to a second display item among the plurality of display items than the first display item, the controller controls the display unit to move the virtual pointer onto the second display item.

7. The display apparatus of claim 5, wherein in response to input of a selection command from the input device through the communicator, the controller is configured to move the virtual pointer into a center of a display item.

8. The display apparatus of claim 5, wherein the input device is an absolute pointing type of input device.

* * * * *